United States Patent
MacInnis et al.

(10) Patent No.: US 7,440,504 B2
(45) Date of Patent: Oct. 21, 2008

(54) METHOD AND APPARATUS FOR PERFORMING DEBLOCKING FILTERING WITH INTERLACE CAPABILITY

(75) Inventors: Alexander G. MacInnis, Los Altos, CA (US); Sheng Zhong, Fremont, CA (US); Jose R. Alvarez, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 493 days.

(21) Appl. No.: 10/246,977

(22) Filed: Sep. 19, 2002

(65) Prior Publication Data

US 2003/0058944 A1    Mar. 27, 2003

Related U.S. Application Data

(60) Provisional application No. 60/324,300, filed on Sep. 24, 2001.

(51) Int. Cl.
H04N 7/12 (2006.01)
H04N 11/02 (2006.01)
H04N 11/04 (2006.01)
H04B 1/66 (2006.01)

(52) U.S. Cl. ............................................. 375/240.29
(58) Field of Classification Search ............ 375/240.29, 375/240.27, 240.26, 240.16; 382/232, 233, 382/236; H04N 7/12
See application file for complete search history.

(56) References Cited

U.S. PATENT DOCUMENTS

| | | | | |
|---|---|---|---|---|
| 5,265,173 A | * | 11/1993 | Griffin et al. | 382/103 |
| 5,610,729 A | | 3/1997 | Nakajima | |
| 5,825,419 A | * | 10/1998 | Mishima et al. | 375/240.15 |
| 6,005,983 A | * | 12/1999 | Anderson et al. | 382/254 |
| 6,020,931 A | * | 2/2000 | Bilbrey et al. | 348/584 |
| 6,320,905 B1 | * | 11/2001 | Konstantinides | 375/240.08 |
| 6,330,032 B1 | * | 12/2001 | Boehlke | 348/452 |
| 6,396,061 B1 | * | 5/2002 | Owechko | 375/240.29 |
| 6,636,645 B1 | * | 10/2003 | Yu et al. | 382/268 |
| 6,665,346 B1 | * | 12/2003 | Lee et al. | 375/240.29 |
| 6,810,086 B1 | * | 10/2004 | Puri et al. | 375/240.29 |
| 6,859,499 B2 | * | 2/2005 | Hashimoto | 375/240.27 |

FOREIGN PATENT DOCUMENTS

EP    0714209    5/1996

OTHER PUBLICATIONS

"H.26L Test Model Long Term No. 8 (TML-8) Drafto" ITU-T Telecommunications Standardization Sector of ITU, Geneva, CH, Apr. 2, 2001, pp. 1-54.
Hong M-C: "An Efficient Loop/Post Filter to Reduce Annoying Artifacts of H.26L Video Coder" International Conference On Consumer Electronics. 2000 Digest of Technical Papers. ICCE. Jun. 13-15, 2000, New York, NY: IEEE, US, Jun. 13, 2000, pp. 240-241.
Borgwardt P: "Core Experiment on Interlaced Video Coding" ITU-Telecommunications Standardization Sector, Study Group 16 Question 6, VCEG-059, Dec. 4, 2001.

* cited by examiner

*Primary Examiner*—Nhon T Diep
(74) *Attorney, Agent, or Firm*—McAndrews Held & Malloy Ltd.

(57) ABSTRACT

A method and apparatus are disclosed for adaptively selecting a deblocking filter used in video de-blocking. Determinations are made as to whether each of a set of spatially adjacent video blocks is inter-coded or intra-coded and whether each of said adjacent video blocks is field-coded or frame-coded. A deblocking filter is selected (an interlace deblocking filter or a frame deblocking filter) based on the determinations. The selected deblocking filter is used to filter across a boundary between adjacent video blocks.

18 Claims, 3 Drawing Sheets

METHOD AND APPARATUS FOR PERFORMING DEBLOCKING FILTERING WITH INTERLACE CAPABILITY

CROSS-REFERENCE TO RELATED APPLICATIONS

The applicants claim priority based on provisional application No. 60/324,300 filed Sep. 24, 2001, the complete subject matter of which is incorporated herein by reference in its entirety.

BACKGROUND OF THE INVENTION

Certain embodiments of the present invention relate to the process of filtering video data. More specifically certain embodiments relate to adaptively filtering reconstructed blocks of video data, comprising both frame-coded and field-coded blocks, in order to improve coding efficiency and image quality as part of the de-blocking process.

Various video compression schemes use different sizes of blocks of pixels. For example MPEG-2 uses a 16×16 block of pixels (referred to as a "macroblock"). One motivation for creating the MPEG-2 standard was to support interlaced video. MPEG-2 targets coding for broadcast-quality video. Therefore, it is desired to digitize the source video at full bandwidth, resulting in even and odd fields. The two fields are separated in time and MPEG-2 provides a way of coding interlaced fields by including field-based prediction techniques.

A coded representation of a video picture may be reconstructed to a frame or a field. During the encoding process, an encoder codes a frame as one picture frame or two field pictures. For encoding as two field pictures, each field is coded independently of the other. In other words, the two fields are coded as if they are two different pictures.

For frame pictures, each macroblock may be predicted (using motion compensation) on a frame or field basis. Frame-based prediction uses one motion vector per direction (forward or backward) to capture the motion with respect to a reference frame. Field-based prediction uses two motion vectors, one for each field. As a result, there may be up to four vectors (two per direction) per macroblock.

Some coding standards, such as H.263 and H.26L, make use of a de-blocking filter in the coding and decoding loop in order to reduce blocking artifacts at the edges where one block interfaces to another. The de-blocking filter may take on a variety of forms depending on the standard. However, deblocking filtering generally involves processing of pixels along the video block edges spanning across neighboring block boundaries in both horizontal and vertical directions.

A set of reconstructed video blocks may be filtered to improve the image quality across the boundaries of the blocks during the video deblocking process.

Current standards making use of deblocking filters are based on progressive video content (frame-coded). Particularly in the case of loop filtering, the horizontal and vertical edges of the block consists of pixels that are correlated in both horizontal and vertical directions in the sense that they have been sampled at the same frame-time. This is the normal result of the fact that progressive video is being processed. Known prior art involving deblocking filtering does not, however, deal with field-coded blocks (interlaced fields).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

An embodiment of the present invention adaptively selects the type of deblocking filter to use (frame filtering or interlace filtering) along with the corresponding set of filter coefficients for a given boundary between two adjacent reconstructed blocks of video data. An embodiment of the present invention provides the adaptive deblocking filter selection by, at least in part, determining whether blocks are frame-coded or field-coded.

A method is provided for adaptively selecting a deblocking filter used in video de-blocking. The method determines whether each of a set of spatially adjacent video blocks is inter-coded or intra-coded and then determines if each of said adjacent video blocks is field-coded or frame-coded. A deblocking filter is selected (an interlace deblocking filter or a frame deblocking filter) based on the determinations. The selected deblocking filter is to be used to filter across a boundary between adjacent video blocks.

Also, apparatus is provided for adaptively selecting and employing a deblocking filter used in video de-blocking. The apparatus comprises a deblocking filter selection module responsive to at least video block data and video header data to select a deblocking filter. Also, the apparatus comprises a deblocking filter module to be used to filter across a corresponding boundary between adjacent video blocks.

DETAILED DESCRIPTION OF THE INVENTION

Figure 1:
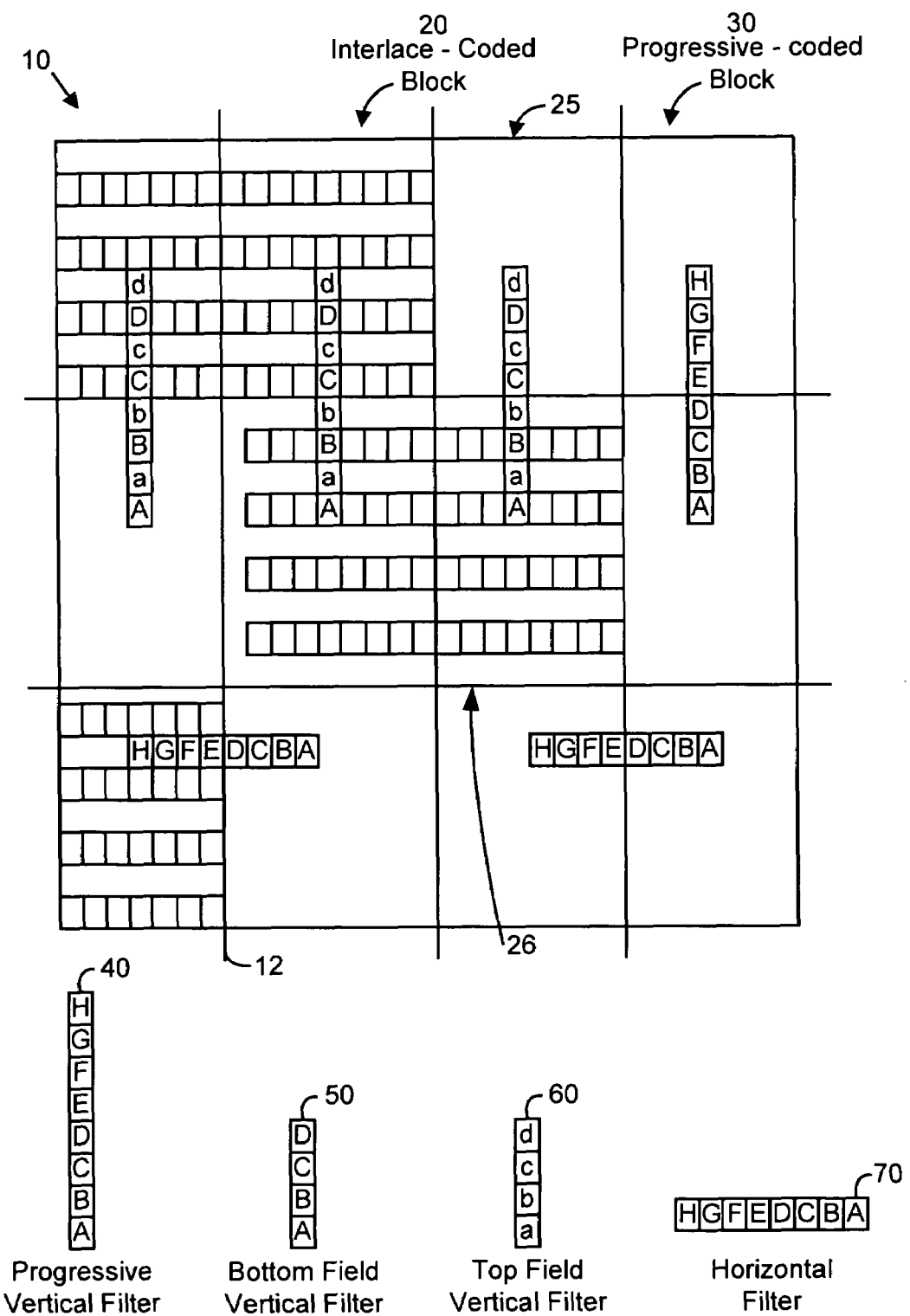
FIG. 1 is an illustration of a set of adjacent blocks of video pixels and how to filter across boundaries between the blocks in accordance with an embodiment of the present invention.

FIG. 1 is an illustration of a set 10 of adjacent blocks of video pixels and how to filter across boundaries between the blocks in accordance with an embodiment of the present invention. Each video block is coded in either a frame mode (e.g. block 30) or field mode (e.g. block 20).

A possible solution for coding interlaced pictures is to simply code the fields as separate pictures so that all blocks in the field are field-coded. However, this may have drawbacks of reduced coding efficiency and picture quality. Another possible solution is to code each block in a given frame with independent selections per block of either a progressive entity ("frame coded") or as an interlaced entity containing lines from two fields ("field coded").

Frame coded blocks are the default for progressive video coding standards. In field mode blocks in frame pictures, half the lines in the block are generated from one field of video and the other half of the lines come from the other field which may necessitate special procedures if deblocking filtering is to be used.

To support both field-coded and frame-coded blocks in the same frame picture, there may be a problem with deblocking filtering at the interfaces between adjacent blocks where a block on one side of the interface is field coded and a block on the other side of the interface is frame coded. There may be problems in both the horizontal and vertical directions, but it is particularly difficult in the vertical direction since adjacent lines in the frame are not from the same sampling time, i.e., adjacent frame lines (and therefore block lines) belong to different fields. The situation is illustrated in FIG. 1, where the gray lines of pixels denote data that has been frame-coded (e.g. block 30), while the black and white lines denote lines of pixels that have been coded as separate fields (e.g. block 20).

Support of interlaced (field-coded) blocks with deblocking is provided by an embodiment of the present invention. One aspect of the present invention is the performance of deblocking filtering across an interface between a frame-coded block and a field-coded block, with different filtering modes and selections of lines to be filtered depending on the field or frame coded type of each block, as well as on other parameters, for example.

Regardless of how a particular standard specifies the performance of deblocking filtering, the pixels across the block edges are analyzed and processed and, given certain results from the analysis, the actual values of the edge pixels are changed with the goal of reducing block coding artifacts.

One solution in accordance with an embodiment of the present invention involves examining whether vertically adjacent blocks are coded as separate fields in order to program the filter and analysis windows to handle the field data independently as appropriate. It may be assumed that if a block has been field-coded there must have been a good reason on the part of the encoder to make the choice, i.e., there was inter-field motion in the video being encoded.

Figure 2:
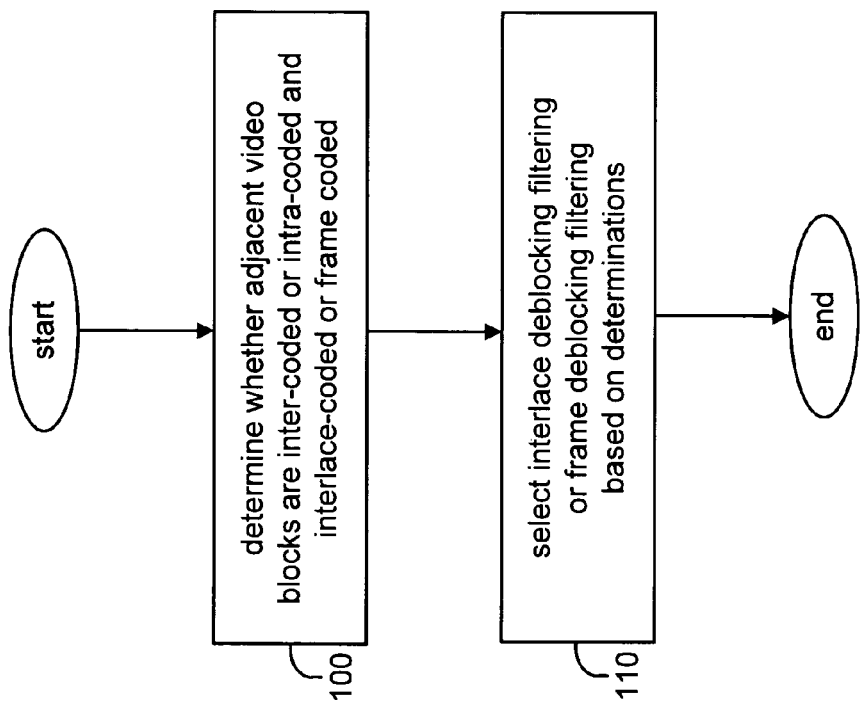
FIG. 2 is a flowchart of a method for adaptively selecting a deblocking filter used in video de-blocking the set of adjacent blocks of video pixels in FIG. 1 in accordance with an embodiment of the present invention.

FIG. 2 illustrates a method of determining the type of deblocking filtering to be employed, in accordance with an embodiment of the present invention. First, in step 100, determinations are made whether adjacent blocks (e.g., top and bottom) were inter-coded or intra-coded and field-coded or frame-coded. Blocks that are inter-coded are dependent on previous and/or subsequent frames of video data (temporal dependency) and typically have motion vectors associated with them. Blocks that are intra-coded are dependent only on the current frame of data and do not have motion vectors associated with them.

Field-coded blocks typically have two motion vectors associated with them, one for each field. Frame-coded blocks typically have only one unique motion vector associated with them. Again, only blocks that are inter-coded have motion vectors associated with them. The motion vectors and indications of whether a block is inter-coded or intra-coded and frame-coded or field-coded are contained in the video header data that is associated with each video block of data.

In step 110, the previous determinations are used to help select between interlace deblocking filtering and frame deblocking filtering. For example, certain indications contained in the header data, such as whether a video block is frame-coded or field-coded, may be used. Also, the length of the filter and the exact filter coefficients to be used may be determined, in part, by the previous determinations and others information such as, for example, the size of the video blocks (e.g. 16 pixels by 16 pixels).

Figure 3:
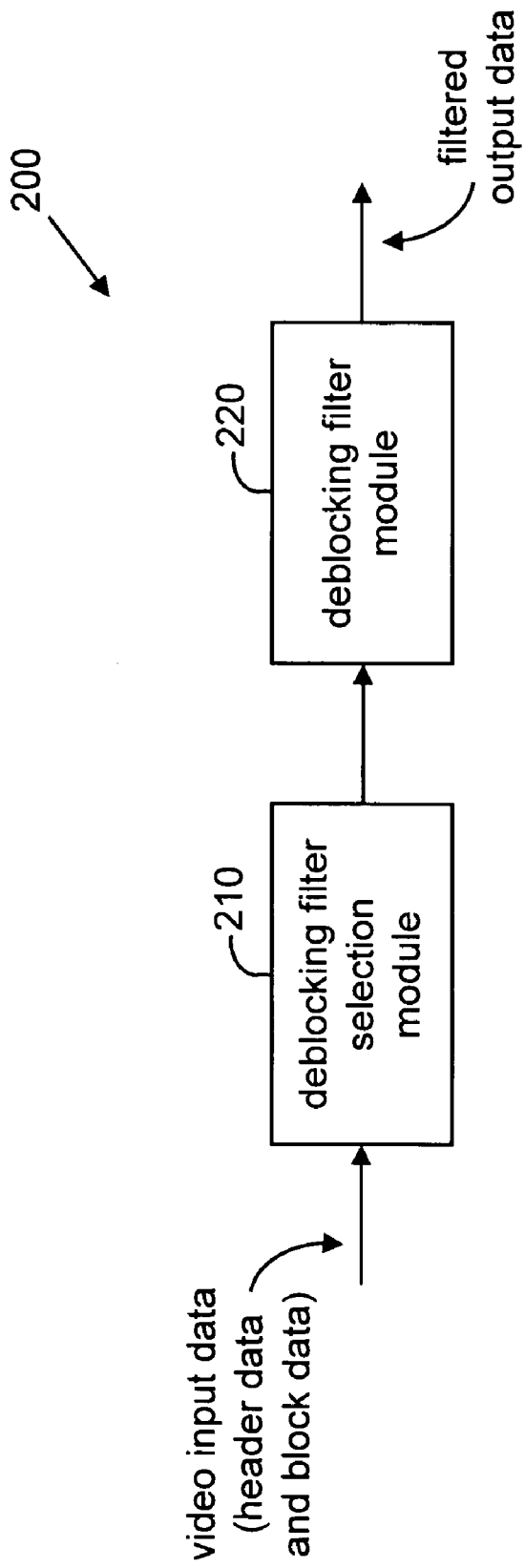
FIG. 3 is a schematic block diagram of an apparatus for performing the method of FIG. 2 in accordance with an embodiment of the present invention.

FIG. 3 is a schematic block diagram of an apparatus 200 for performing the method of FIG. 2 in accordance with an embodiment of the present invention. Typically, the apparatus 200 is integrated and embedded into an ASIC chip that performs video processing. The apparatus 200 comprises a deblocking filter selection module 210 and a deblocking filter module 220.

Video data (header data and video block data) are input to the deblocking filter selection module 210. Deblocking filter selection module 210 determines which blocks are inter-coded or intra-coded and which blocks are frame-coded or field-coded. Deblocking filter selection module 210 interfaces to deblocking filter module 220 which performs deblocking filtering across the boundaries of adjacent blocks.

In an embodiment of the present invention, the deblocking filter selection module 210 also selects the length of the filter and the corresponding filter coefficients to be used based on information in bit stream. The selected information is sent to the deblocking filter module 220 where the adjacent video blocks are subsequently filtered.

The various elements of the apparatus may be combined or separated according to various embodiments of the present invention. For example, the deblocking filter selection module 210 and the deblocking filter module 220 may be implemented as a single processing element instead of as two discrete elements interfacing to each other.

In an embodiment of the present invention, the pixels along vertically-oriented edges (e.g. 12, see FIG. 1) between dissimilar field and frame coded blocks are processed by adaptively filtering the edge of one field in the field-coded block with the corresponding lines in the adjacent frame-coded block, and also adaptively filtering the edge of the other field in the field-coded block with its corresponding lines in the adjacent frame-coded block (see FIG. 1).

In certain embodiments of the present invention, the horizontal filter and analysis window 70 is the same whether the adjacent blocks have been coded as frames or fields. In other embodiments of the present invention, the filter operation on vertical edges may differ, for example, if the filter processes a 2-dimensional set of pixels.

When processing the horizontally-oriented edges, a vertical filter and analysis window 40 is used which takes into account whether adjacent blocks (above or below the edge) are field-coded or frame-coded. In an embodiment of the present invention, if vertically adjacent blocks (either top neighbor or bottom neighbor) differ in the way they were coded (progressive or interlace, i.e., frame or field coded) two separate versions of the filter and analysis window may be used, one for each field (50 and 60 in FIG. 1). The top field lines of both blocks are processed separately from the bottom field lines (see, e.g., vertical filters 50 and 60 in FIG. 1).

In FIG. 1, the filter and analysis window for pixels in the frame-coded blocks in the same frame is denoted as {A, B, C, D, E, F, G, H} 40 (assuming in the example a maximum window of eight pixels, four at each side of the block edge—the same method is readily extended to different numbers of pixels). The same filter and analysis window (but oriented horizontally 70) may also be used for the vertical edge (horizontal filter/analysis) regardless of frame or field coding.

For the cases where either top or bottom neighboring blocks are field-coded, the 8-pixel window may be separated into two 4-pixel windows: {a, b, c, d} 60 for the top field and {A, B, C, D} 50 for the bottom field. As may be seen in FIG. 1, the frame-coded block 25 is separated into top field and bottom field portions to match the field-coded block 26. For an 8-tap window, all 4 positions on one side may be used, particularly for frame coded macroblocks, while either 2 of the 4 taps on the other (e.g. field coded) side may be used. Equivalently, pixels from one field of the field coded block on the field coded side of the boundary may use, for example, all 4 positions on that side of the filter window.

The method described above implies that the actual filter length for vertically adjacent blocks in which any neighbor was field-coded is half the size of the filter for frame-coded blocks. However, different sets of coefficients may be used for the field-coded edges and it is not necessary that the field-coded version of the filter be half the size of the frame-coded version.

Variations are possible using longer or shorter filters, different coefficients, or a different selection of pixels in the filter. For example, in the case of H.26L Filtering, the changes to handle interlace with minimal changes to the specification from September 2001 (TML-8) may involve only processing four edge pixels (p2, p1, q1, q2). In cases where p3 or q3 are used in the formulas, they may be substituted for p1 and q1, respectively.

In summary, the interlaced deblocking filter of certain embodiments of the present invention allows the use of modern interlaced coding methods in digital video compression methods, while simultaneously supporting high quality deblocking filtering, for best quality visual results.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of selecting a deblocking filter used in video processing, said method comprising:
   determining whether a first video block and a second video block are frame-coded or field-coded, wherein the first video block and the second video block are spatially adjacent;
   selecting the deblocking filter based on said determining wherein if the first video block is frame-coded and the second video block is field-coded and the video blocks share a border that is horizontal, the deblocking filter uses samples from the first video block that are adjacent and samples from the second video block that are in one of a top field and a bottom field; and
   filtering, with the deblocking filter.

2. The method of claim 1 wherein said determining comprises reading video header data associated with each of said adjacent video blocks, wherein said video header data indicates field-coded or frame-coded.

3. The method of claim 1, wherein if the border is vertical, the deblocking filter uses samples from the first video block that are adjacent and samples from the second video block that are adjacent.

4. The method of claim 1, wherein if the video blocks are both frame-coded and the border is horizontal, the deblocking filter uses samples from the first video block that are adjacent and samples from the second video block that are adjacent.

5. The method of claim 1, wherein if the video blocks are both field-coded and the border is horizontal, the deblocking filter uses samples in the top field of the first video block with samples in the top field of the second video block.

6. The method of claim 1, wherein if the video blocks are both field-coded and the border is horizontal, the deblocking filter uses samples in the bottom field of the first video block with samples in the bottom field of the second video block.

7. The method of claim 1 wherein said frame deblocking filtering comprises generating at least one filtered video sample on at least one side of said boundary between said adjacent video blocks by performing digital filtering on a predetermined number of contiguous video samples across said boundary.

8. An apparatus for selecting a deblocking filter used in video processing, said apparatus comprising:
   a deblocking filter selection module for selecting a deblocking filter associated with a border between a first video block and a second video block, wherein the deblocking filter selection is based on the size of the first video block and the second video block; and
   a deblocking filter module responsive to said selecting to perform filtering,
   wherein if the first video block is frame-coded and the second video block is field-coded and the border is horizontal, the deblocking filter uses adjacent video samples in the first video block and video samples from one of a top field and a bottom field in the second video block.

9. The apparatus of claim 8, wherein if the border is vertical, the deblocking filter uses samples from the first video block that are adjacent and samples from the second video block that are adjacent.

10. The apparatus of claim 8, wherein if the video blocks are both frame-coded and the border is horizontal, the deblocking filter uses samples from the first video block that are adjacent and samples from the second video block that are adjacent.

11. The apparatus of claim 8, wherein if the video blocks are both field-coded and the border is horizontal, the deblocking filter uses samples in the top field of the first video block with samples in the top field of the second video block.

12. The apparatus of claim 8, wherein if the video blocks are both field-coded and the border is horizontal, the deblocking filter uses samples in the bottom field of the first video block with samples in the bottom field of the second video block.

13. The apparatus of claim 9 wherein said frame deblocking filter generates at least one filtered video sample on at least one side of said at least one boundary between said at least two adjacent video blocks by performing digital filtering on a predetermined number of contiguous video samples across said at least one boundary.

14. The apparatus of claim 8 wherein said apparatus is integrated and embedded into an ASIC chip used in video processing.

15. A system for deblock filtering in a video processor, said system comprising:
   an integrated circuit comprising:
   a first circuit for identifying the size of a first video block and a second video block; and
   a second circuit for deblock filtering a common border of the pair of adjacent blocks using a first set of filter coefficients based on the size of the first video block and the second video block,
   wherein if the first video block is frame-coded and the second video block is field-coded and the common border is horizontal, the deblocking filter uses adjacent video samples in the first video block and video samples from one of a top field and a bottom field in the second video block.

16. The system of claim 15, wherein the second circuit generates at least one filtered video sample on at least one side of the common border of the pair of adjacent blocks.

17. The system of claim 15, wherein if the common border is horizontal and the video blocks are both field-coded, the second circuit uses a second set of filter coefficients.

18. The system of claim 17, wherein the second set of filter coefficients is applied to a set of video samples that are separated by at least one row.

* * * * *